US008719733B2

(12) United States Patent
Liao et al.

(10) Patent No.: US 8,719,733 B2
(45) Date of Patent: May 6, 2014

(54) SELECTING A NAVIGATION HIERARCHICAL STRUCTURE DIAGRAM FOR WEBSITE NAVIGATION

(75) Inventors: Jian Liao, Hangzhou (CN); Feng Lin, Hangzhou (CN); Shousong Zhang, Hangzhou (CN); Qin Zhang, Hangzhou (CN)

(73) Assignee: Alibaba Group Holding Limited (KY)

( * ) Notice: Subject to any disclaimer, the term of this patent is extended or adjusted under 35 U.S.C. 154(b) by 357 days.

(21) Appl. No.: 13/134,324

(22) Filed: Jun. 2, 2011

(65) Prior Publication Data

US 2011/0307839 A1 Dec. 15, 2011

(30) Foreign Application Priority Data

Jun. 9, 2010 (CN) .......................... 2010 1 0201129

(51) Int. Cl.
*G06F 3/0481* (2013.01)
*G06F 3/0482* (2013.01)
(52) U.S. Cl.
USPC ............................. 715/854; 715/825
(58) Field of Classification Search
USPC ................................. 715/854, 825
See application file for complete search history.

(56) References Cited

U.S. PATENT DOCUMENTS

| 6,489,968 | B1 | 12/2002 | Ortega et al. |
| 6,606,619 | B2 | 8/2003 | Ortega et al. |
| 7,028,261 | B2 | 4/2006 | Smyth et al. |
| 7,353,460 | B2 | 4/2008 | Tu |
| 7,631,264 | B2 | 12/2009 | Jarrad et al. |
| 2002/0138525 | A1 | 9/2002 | Karadimitriou et al. |
| 2003/0126235 | A1 | 7/2003 | Chandrasekar et al. |
| 2005/0267902 | A1 | 12/2005 | Thurnhofer et al. |
| 2005/0278351 | A1 | 12/2005 | Niyogi et al. |
| 2006/0074907 | A1* | 4/2006 | Singhal et al. ................ 707/6 |
| 2007/0094267 | A1 | 4/2007 | Good et al. |
| 2007/0118793 | A1 | 5/2007 | Arora et al. |
| 2009/0006179 | A1* | 1/2009 | Billingsley et al. ............. 705/10 |
| 2009/0044150 | A1 | 2/2009 | Liu et al. |
| 2009/0150343 | A1 | 6/2009 | English et al. |
| 2009/0282013 | A1 | 11/2009 | Joshi et al. |
| 2010/0014859 | A1* | 1/2010 | D'Alessandro et al. ........ 398/48 |
| 2010/0082640 | A1 | 4/2010 | Wexler et al. |
| 2011/0307839 | A1 | 12/2011 | Liao et al. |

FOREIGN PATENT DOCUMENTS

JP  2007233443 A  9/2007

* cited by examiner

*Primary Examiner* — Doug Hutton, Jr.
*Assistant Examiner* — Ashley Fortino
(74) *Attorney, Agent, or Firm* — Van Pelt, Yi & James LLP

(57) ABSTRACT

Implementing website navigation includes deriving a confidence level for at least one leaf node of a website navigation category diagram using historical user operation data; generating one or more navigation hierarchical structure diagrams based on the website navigation category diagram; determining a searching cost associated with each of the one or more navigation hierarchical structure diagrams; determining the navigation hierarchical structure diagram associated with the lowest searching cost; and implementing at least in part a website navigation mode using the navigation hierarchical structure diagram associated with the lowest searching cost.

17 Claims, 7 Drawing Sheets

SELECTING A NAVIGATION HIERARCHICAL STRUCTURE DIAGRAM FOR WEBSITE NAVIGATION

CROSS REFERENCE TO OTHER APPLICATIONS

This application claims priority to People's Republic of China Patent application No. 201010201129.0 entitled A WEBSITE NAVIGATION IMPLEMENTATION METHOD AND SYSTEM filed Jun. 9, 2010 which is incorporated herein by reference for all purposes.

FIELD OF THE INVENTION

The present application relates to the field of computer applications technology, and in particular to implementing a website navigation process.

BACKGROUND OF THE INVENTION

Websites are increasingly featuring more content. In order to enable users to quickly locate desired content on websites, websites often provide navigation functions. Typically, a commonly-used website navigation process is a navigation method based on stratified data drives. One example of stratified data drives involves the formation of a graphic structure layered category navigation system. In a graphic structure layered category navigation system, certain methods are used to match user queries to a certain navigation status node to produce the navigation status one level below this node; while at the same time, the user can traverse each of the individual nodes of the navigation structure to engage in dynamic navigation.

To use an electronic commerce website as an example, assume that the user wants to search for a notebook computer of the brand "Apple." After inputting the search keyword "apple", the user engages in Level 1 category navigation. An example of Level 1 category navigation results can be seen in FIG. 1A, where several "Departments" are listed under "Any Department" including "Electronics," "Wireless Accessories," and "Software" and so forth. Assume that in this example, the user clicks on the "Electronics" navigation node in the Level 1 category navigation results based on that electronics' category's relationship to notebook computers. Subsequent to selecting "Electronics," the user enters Level 2 category navigation. An example of Level 2 category navigation results can be seen in FIG. 1B, where several sub-categories under "Electronics" are displayed, including "Computer & Accessories," "Portable Audio & Video" and "Accessories & Supplies" and so forth. The user then clicks on the "Computer & Accessories" navigation node in the Level 2 category navigation results. The resulting navigation results can be seen in FIG. 1C, where the desired category of "Laptops" is located in the Level 3 navigation results.

In the example of navigation mode as described above, the search results that the user desires is located in the last level of the navigation results, which is also a leaf node of the navigation category diagram. However, the process for users to find leaf nodes requires undergoing multiple level-by-level clicking operations, and the website server has to respond to each of the user's clicking operation with the corresponding navigation results. Such back and forth between the user and the website server can cause an increase in the burden on the website server and consumption of network bandwidth. Moreover, from the user's perspective, because locating the desired search results usually requires multiple instances of clicking operations, it also requires the viewing of multiple determinations before the desired next level down node can be located and selected, which can be inconvenient.

BRIEF DESCRIPTION OF THE DRAWINGS

Various embodiments of the invention are disclosed in the following detailed description and the accompanying drawings.

In order to more clearly explain the embodiments of the present application or the technical programs of existing technologies, a simple introduction will be given below of the Attached Diagrams that must be used in describing the embodiments or existing technologies, and it is easily seen that the Attached Diagrams in the description below are merely some embodiments recorded in the present application, and for common technical personnel in this field, other Attached Diagrams can also be derived based on these Attached Diagrams.

DETAILED DESCRIPTION

Figures 1A, 1B, 1C:
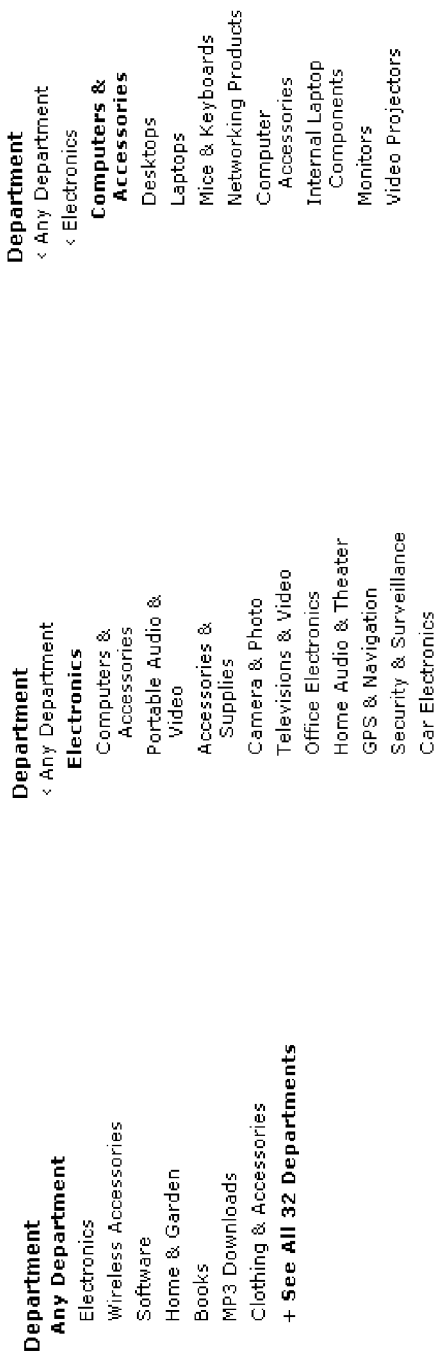
FIG. 1A, FIG. 1B, and FIG. 1C are examples of website navigation results.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Implementing website navigation is disclosed. In various embodiments, a website navigation category diagram corresponds to the initial hierarchical relationships of categories of information at a website. For example, for an electronic commerce website, the categories of information associated with the website can include categories of products offered at the website. The hierarchy of relationships between the categories can be represented as the sequence in which information is browsed and displayed at a webpage. For example, one or more categories of information can be returned and displayed (e.g., in response to a search query for a product at the website). Then, subsequent to a selection of (e.g., via a user's clicking on a selectable item at the webpage) one of the categories, one or more categories at the next, lower level of the hierarchy (e.g., subcategories) can be displayed for further selection. Subsequent to the next selection, more subcategories could appear. A user may continue to browse in this manner until, for example, the last category (for which there are no subcategories) is reached.

In some embodiments, historical data on user search behavior is queried and used to derive the confidence level for each leaf node of the website navigation category diagram. In some embodiments, at least one navigation hierarchical structure diagram is generated based on the website navigation diagram. In some embodiments, a navigation hierarchical structure diagram has leaf nodes that are substantially similar to those of the website navigation category diagram. In some embodiments, the searching cost for each generated navigational hierarchical structure diagram is calculated and the navigation hierarchical structure diagram with the lowest searching cost is determined. In some embodiments, the navigation hierarchical structure diagram determined to have the lowest searching cost is used to implement at least in part a website navigation process. In some embodiments, the implemented website navigation process determines the sequence and/or experience by which a user browses through the hierarchy of categories at a website. In some embodiments, the navigation hierarchical structure diagram is used to possibly modify the original order and/or relationship of categories and subcategories of information from the relationships as indicated by the initial website navigation category diagram to provide a more efficient navigation/browsing experience for users of the associated website.

Figure 2:
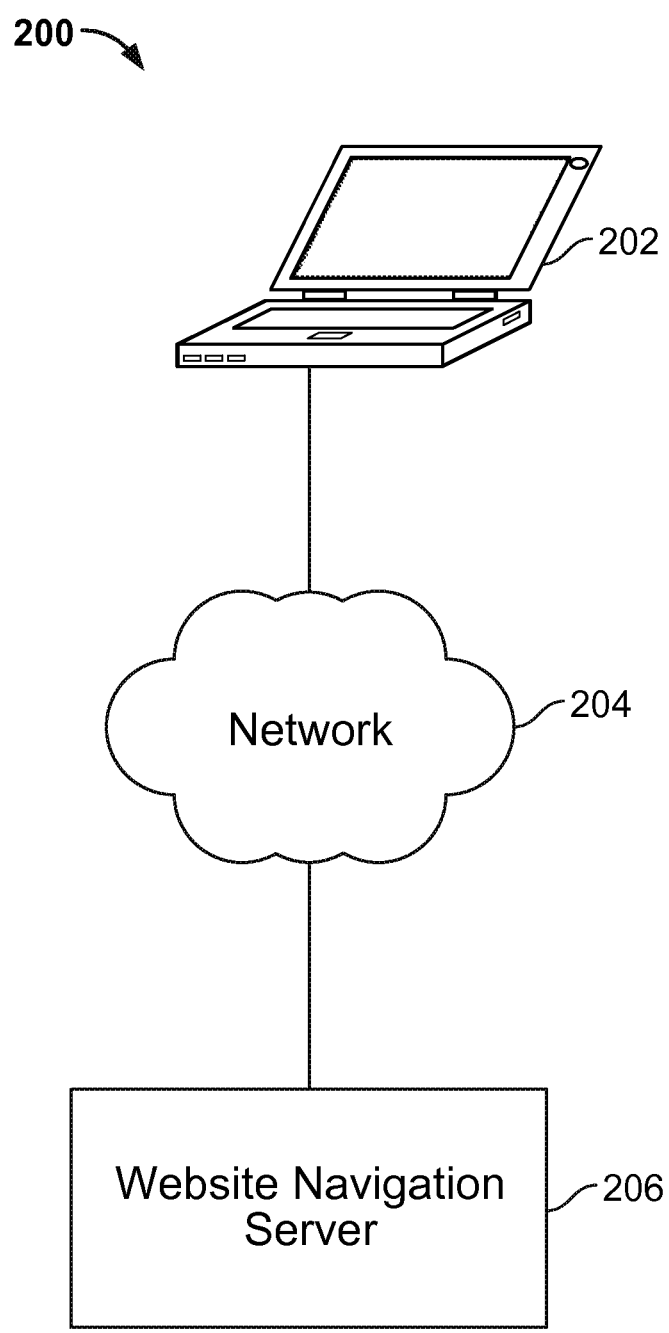
FIG. 2 is a diagram showing an embodiment of a system of website navigation.

FIG. 2 is a diagram showing an embodiment of a system of website navigation. In the example of FIG. 2, system 200 includes device 202, network 204, and website navigation server 206. Network 204 includes various high speed data networks and/or telecommunications networks. Device 202 communicates with website navigation server 206 via network 204.

Device 202 is configured to access an online website. In various embodiments, device 202 includes a web browser application (e.g., Google Chrome, Microsoft Internet Explorer). While device 202 is shown to be a laptop in FIG. 2, other examples of device 202 can include a desktop computer, a mobile device, a smart phone, a tablet device, and other appropriate client devices. For example, a user using device 202 can access a website such as an electronic commerce website. At the electronic commerce website, the user can submit a query related to a product of interest. After performing a search, the website can return and display one or more product categories of relevant results. The user can then browse through the hierarchy of category of information. For example, the user may browse through one level of category information, select a category among that level and receive a display of subcategories of information under that selected category. The user can continue to repeat browsing and selecting a category until the user has reached the last and desired category in the hierarchy (e.g., a category for which there is no subcategory) at which, for example, links to product pages appear to assist in browsing for specific products.

Website navigation server 206 is configured to implement website navigation. In some embodiments, website navigation server 206 is associated and/or is a component of a web server that supports a website (e.g., an electronic commerce website). In some embodiments, a website navigation category diagram is automatically determined by website navigation server 206, predetermined by an operator website navigation server 206 or received from an external source at website navigation server 206. In various embodiments, a website navigation category diagram shows, for example, via a tree structure, the initial hierarchical relationships between the categories and sub-categories of information to be displayed at a website. In some embodiments, website navigation server 206 derives confidence levels for the leaf nodes of the website navigation category diagram using historical data of user operation data (e.g., that is retrieved from an associated storage). In some embodiments, website navigation server 206 generates one or more navigation hierarchical structure diagrams. A navigation hierarchical structure diagrams includes leaf nodes that are substantially similar to at least a subset of the nodes of the website navigation category diagram, but the leaf nodes of a navigation hierarchical structure diagram are arranged differently than the hierarchical relationships of the leaf nodes at the website navigation category diagram. For example, one or more navigation hierarchical structure diagrams can be generated based on at least a subset of the different arrangements of lead nodes of the website navigation category diagram. Website navigation server 206 determines a viewing cost and a clicking cost for each of the generated navigation hierarchical structure diagrams. Then using the calculated viewing and clicking costs for the navigation hierarchical structure diagram, website navigation server 206 determines a searching cost for each of the navigation hierarchical structure diagrams. In some embodiments, website navigation server 206 determines the navigation hierarchical structure associated with the lowest searching cost and uses it to implement the navigation process of category information at the website. For example, assuming that the website is for electronic commerce, subsequent to implementing the navigation hierarchical structure associated with the lowest searching cost at the website (e.g., as the website navigation process), a user at the website could experience a more convenient experience of browsing through category information (e.g., returned for a user submitted query). For example, the more convenient experience could entail that the user would need to browse through fewer categories before reaching the desired category as compared to the experience before implementing the selected navigation hierarchical structure diagram.

Figure 3:
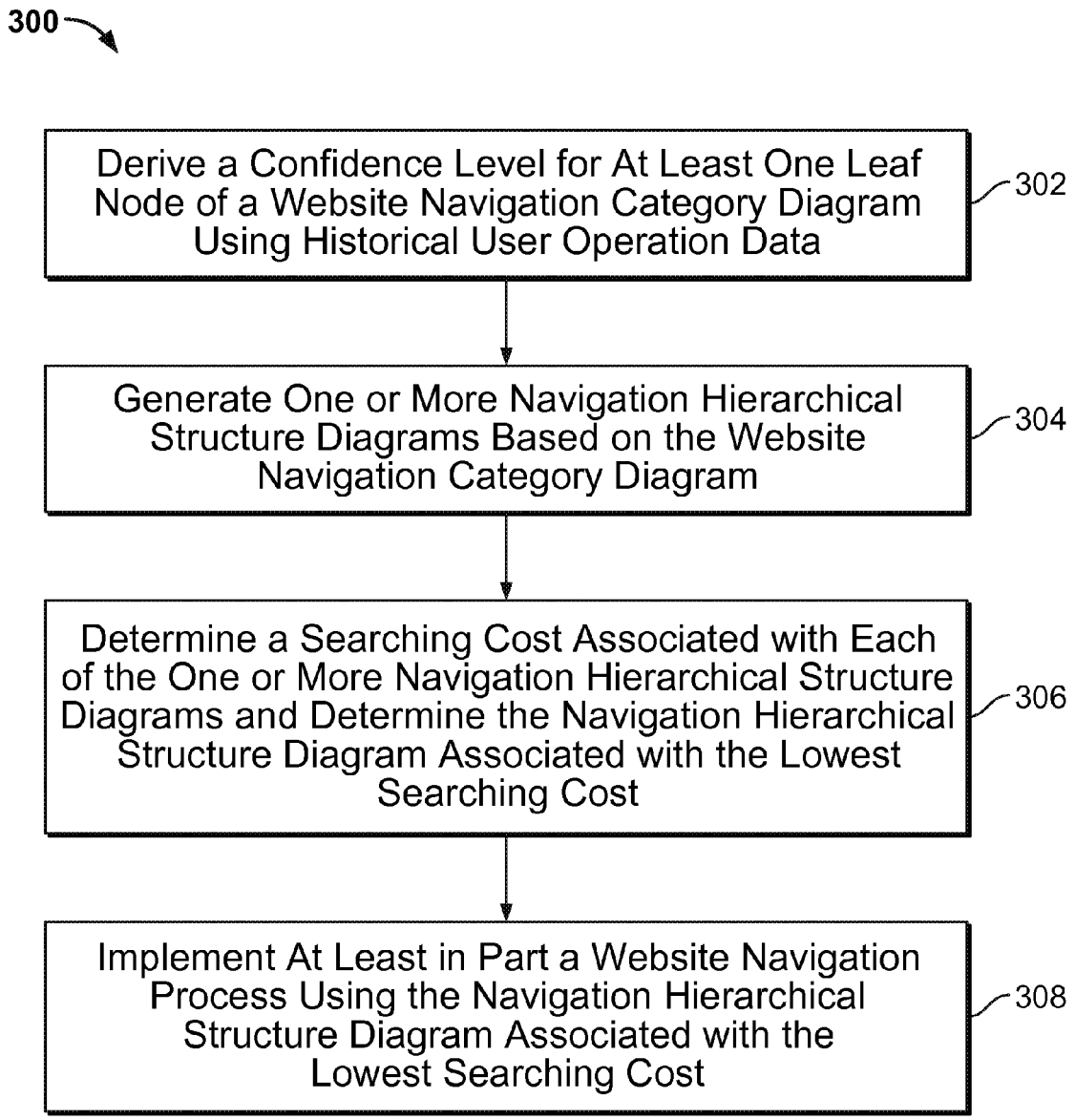
FIG. 3 is a flow diagram showing an embodiment for generating and using website navigation information.

FIG. 3 is a flow diagram showing an embodiment for generating and using website navigation information. In some embodiments, process 300 can be implemented on system 100.

At 302, for at least one leaf node of a website navigation category diagram, a confidence level is derived using historical user operation data.

In various embodiments, a website navigation category diagram shows the relationships between the categories and sub-categories to be displayed at a website. In some embodiments, the website navigation category diagram also provides the order in which category information associated with the website is to be displayed/browsed through in response to events (e.g., a user clicking on a selectable element that is associated with a category). For example, for a website related to selling various products, in response to a search query for the particular product of "keyboard" and using the website navigation category diagram of the website, the website could return a display of various responsive categories (e.g., Music and Computers) to aid the browsing/navigation sequence of the user at the website. In response to a user selecting a selectable element associated with the category of Music, one or more sub-categories could appear such as, for example, Musical Instruments and Sheet Music. Then, in response a user selecting a selectable element associated with Musical Instruments, one or more sub-categories could appear such as, for example, Electronic Musical Instruments and Woodwind Musical Instruments. The user could further select among one of those sub-categories and so forth until the user reaches the category that he desires (e.g., so that he may continue to browse through products related to that desired category). The website navigation category diagram is designed to capture the relationships between the various categories and subcategories (as used herein, subcategory is a relative term that indicates a category that has at least one parent or hierarchically higher category). The website navigation category diagram could be represented by a data structure, such as a tree, that can capture the hierarchical relationships between various categories. In various embodiments, information associated with a category/subcategory is referred to as a node of the website navigation category diagram.

In some embodiments, the confidence level is used to describe the degree of confidence for a leaf node (or the corresponding category information) of the website navigation category diagram (e.g., as represented by a tree data structure) that corresponds to a user search request. Put another way, a confidence level for a leaf node of the website navigation category diagram indicates the likelihood that the information associated with the leaf node is the information that a user is seeking (e.g., as indicated by a selection of that leaf node) through querying and/or browsing/navigating at a website. In some embodiments, historical data on user operation (e.g., browsing) behavior can be queried and retrieved from a database (e.g., that stores histories of one or more user's browsing behavior). For example, for a particular user search request query and browsing behavior, the conditional probability p(category$_j$|query$_i$) can describe the confidence level for the search request query query$_i$ and displayed category category$_j$. This conditional probability is also called the confidence level.

Figure 4:
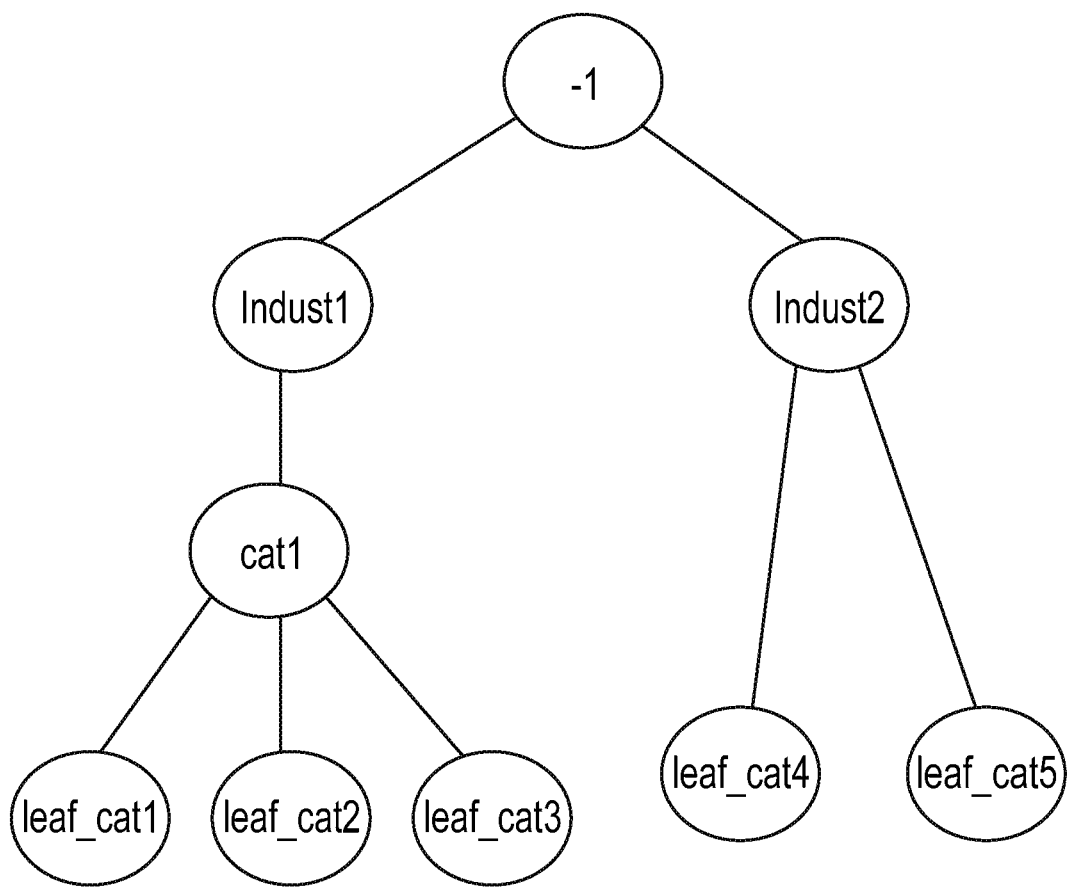
FIG. 4 is an example of a tree-shaped website navigation category diagram.

An example of a tree-shaped website navigation category diagram is illustrated in FIG. 4. As shown in FIG. 4, the root node "-1" represents "all categories." Root node "-1" has two sub-nodes "Indust1" and "Indust2" that represent the two subcategories of "all categories". By the same reasoning, "cat1" is the one subcategory of "Indust1" and "leaf_cat1", "leaf_cat2" and "leaf_cat3" are the three subcategories of "cat1." Likewise, "leaf_cat4" and "leaf_cat5" are the two subcategories of "Indust2."

In the tree-shaped data structure, the nodes located at the bottom (i.e., last level) of the tree are referred to as leaf nodes (e.g., leaf_cat1, leaf_cat2, leaf_cat3, leaf_cat4 and leaf_cat5 of FIG. 4). Often, the search results that users desire are located at the last level of the navigation system, which are usually the information located in the leaf nodes (e.g., at the bottom of the tree) of a tree-shaped navigation category diagram. For example, each search by a user will correspond to clicking on at least one leaf node (e.g., category$_j$), so by querying historical data on user clicking behavior (where each instance of the user's past search request is referred to as an offer), the confidence level for each individual leaf h$_{ij}$ can be derived, for example, using the following formula:

$$h_{ij} = p(\text{category}_j \mid \text{query}_i) = \frac{\text{count (category}_j, \text{query}_i \mid \text{offer})}{\text{count (query}_i \mid \text{offer})} \quad (1)$$

In formula (1), count(category$_j$, query$_i$|offer) represents the number of times for the user's search request (e.g., query$_i$), the corresponding action of clicking on a particular leaf node (e.g., category$_j$) occurred, while count(query$_i$|offer) represents the total number of times that a user's search request occurred.

At 304, one or more navigation hierarchical structure diagrams based on the website navigation category diagram are generated, wherein a navigation hierarchical structure diagram includes leaf nodes that are substantially similar to leaf nodes of the website navigation category diagram.

In some embodiments, the website navigation category diagram illustrates the initial hierarchical relationships of the categories available at the associated website. The example tree-shaped structure diagram as shown in FIG. 4 is a website navigation category diagram applied by some existing website navigation processes, and it corresponds to the initial static hierarchical relationships between nodes/categories of the website corresponding to that website navigation diagram. Under this type of navigation process that is used in some existing navigation processes, if the user wants to find the result they ultimately desire (i.e., the leaf node corresponding to the category desired by the user), the user would likely engage in level-by-level viewing (e.g., reading/scanning through the presented information at the website) and clicking through many selections and webpages, which can cause an increased burden on the website server and added inconvenience for the user.

Figure 5A:
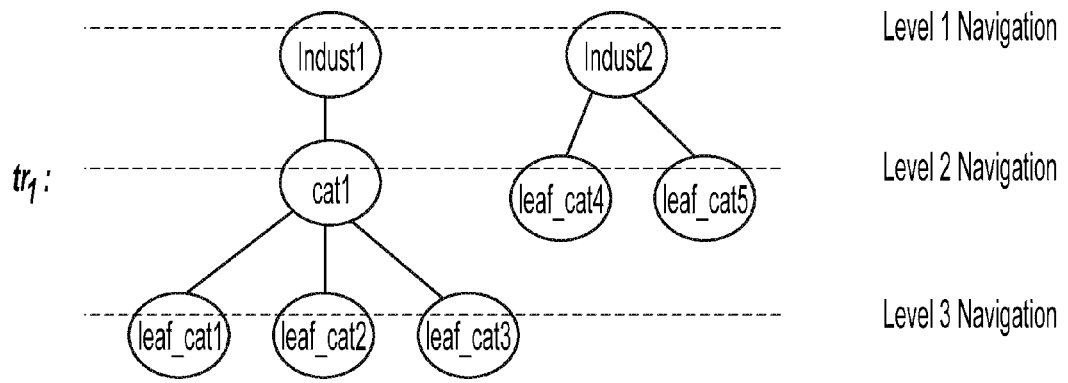
FIG. 5A, FIG. 5B, and FIG. 5C are examples of navigation hierarchical structure diagrams generated based on the website navigation category diagram.
Figure 5B:
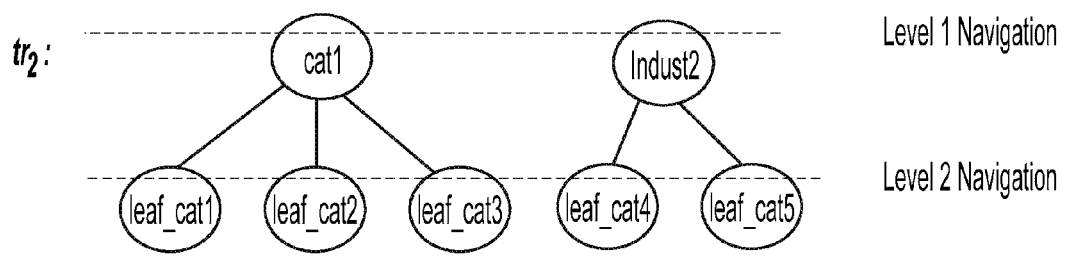
Figure 5C:
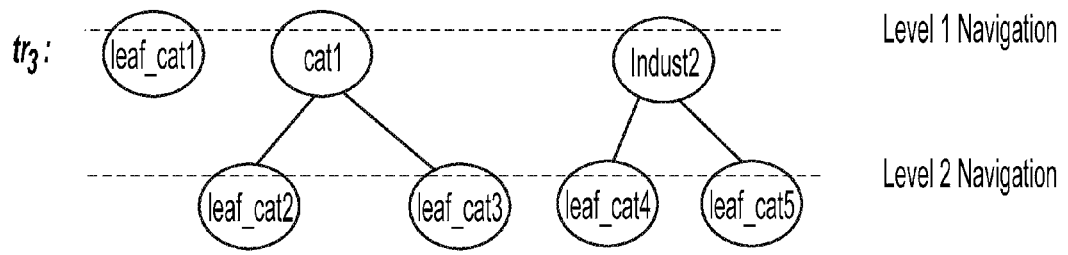

For many websites, the initial hierarchical relationships of their website navigation categories as shown by their website navigation category diagrams are fixed (e.g., not subject to be frequently changed). However, the web server that supports a website does not always need to strictly follow the corresponding hierarchical relationships in a website navigation category diagram during the process of displaying content on a website. In some embodiments, one or more of navigation hierarchical structure diagrams can be generated based on the initial website navigation category diagram, where each of the navigation hierarchical structure diagrams corresponds to a web page navigation display process. In various embodiments, a navigation hierarchical structure diagram is required to have leaf nodes substantially similar to those of the website navigation category diagram. In various embodiments, having leaf nodes substantially similar to the leaf nodes of a website navigation category diagram includes having the leaf nodes (e.g., categories and subcategories) of the tree structure that are substantially similar to those of the original navigation system. In some embodiments, a generated navigation hierarchical structure diagram includes leaf nodes that are substantially similar to those of the website navigation category diagram, arranged in one or more hierarchical structures different than that/those of the initial hierarchical structure associated with the website navigation category diagram. FIGS. 5A, 5B, and 5C show, respectively, three types of website navigation hierarchical structure diagrams generated based on the website navigation category diagram illustrated in FIG. 4. It can be seen that each of navigation hierarchical structure diagrams FIGS. 5A, 5B, and 5C includes leaf nodes that are substantially similar to at least some of the leaf nodes (e.g., Indust 1, Indust 2, cat 1, leaf_cat1, leaf_cat2, leaf_cat3, leaf_cat4, and leaf_cat5) of the website navigation category diagram of FIG. 4.

The website navigation hierarchical structure diagram shown in FIG. 5A is fully consistent with the initial static hierarchical relationship associated with the website navigation category diagram of FIG. 4; FIG. 5B eliminates the Indust1 node in the original website navigation category diagram of FIG. 4; using FIG. 5B as a baseline, FIG. 5C shifts the leaf node leaf_cat1 (which was in Level 2 Navigation of FIG. 5B) to Level 1 Navigation.

By generating one or more navigation hierarchical structure diagrams, it is possible to avoid having user navigation/browsing through categories of a website and to avoid the restrictions imposed by the initial static hierarchical relationships of the website navigation category diagram. Each navigation hierarchical structure diagram can provide one navigation process for a user browsing through categories of information at a website. Comparing the navigation process as shown by FIG. 5C and the original navigation process as shown by FIG. 4, for example, in the navigation process as shown by FIG. 5C, the user does not have to view the display at the webpage that corresponds to the "Indust1" category and the number of clicks (e.g., through various displays of information at the website) needed to reach the leaf nodes "leaf_cat1," "leaf_cat2," and "leaf_cat3" are be reduced. By applying the navigation process corresponding to FIG. 5C, the leaf node "leaf_cat1" can be viewed and clicked on directly, without needing to view and/or click through categories associated with two levels of navigation (Level 1 and 2) as would be required by the navigation process corresponding to FIG. 4.

In some embodiments, in the navigation hierarchical structure diagrams that are generated, each of the nodes can be arranged based on confidence levels. For example, the arrangement sequence of the leaf nodes (e.g., from left to right of the same level of navigation) corresponds to the sequence on the web page in which the categories associated with the leaf nodes are to be displayed. For example, category information associated with the leaf nodes can be arranged from left to right on a webpage or from top to bottom of a webpage based on descending confidence levels. This arrangement is based on the rationale that information that is more often selected (e.g., information of nodes with higher confidence levels) are preferred by users over information that is less often selected (e.g., information of nodes with lower confidence levels).

At 306, a searching cost associated with each of the one or more navigation hierarchical structure diagrams is calculated and the navigation hierarchical structure diagram associated with the lowest searching cost is determined.

Although, in 304, more than one navigation hierarchical structure diagram may be generated, only one navigation hierarchical structure diagram is used to implement the navigation process at a website. In various embodiments, the navigation hierarchical structure diagram that is to be used in implementing the navigation process is selected based on the corresponding searching costs of the structure diagrams. In various embodiments, a searching cost of the navigation hierarchical structure diagram is determined by the viewing cost and the clicking cost, which are separately introduced below:

a) Viewing cost (v_cost):

For a particular search request $query_i$, the user must view Level 1 navigation nodes (e.g., rendered as graphics and/or text on a webpage display) in the navigation hierarchical structure diagram in order to determine whether or not to click to on one or more of those nodes (e.g., or their corresponding graphics/text). V_cost is used to describe the cost of this type of viewing. Generally speaking, the viewing cost associated with the node located lower on a structure diagram is higher (because a user must browse through the nodes and their associated categories higher in the structure diagram first). Thus, v_cost can be defined as a function of at least (past) $query_i$, category (cat) with which the node is associated, the position (pos) of the node within a structure diagram. For example, in one method, historical data regarding one or more user's clicking behavior is queried to produce statistics on the probability p that the category cat located in the position pos will be clicked, and to use p for weighting of the category cat that is being viewed in that position. So, v_cost is a function associated with query $query_i$, position pos, category cat, weighting p and so forth:

$$v\_cost = f(query_i, cat, pos, p)$$

In some embodiments, a simpler way to think about the v_cost of a node in a structure diagram is that the closer the position of the node is to the top (e.g., root node if the structure were a tree; so a Level 1 node would have relatively lower viewing cost than nodes lower on the hierarchy such as a Level 2 node) of the structure diagram, the smaller its associated v_cost would be. This is because a user typically views a webpage displaying information associated with nodes starting from nodes at the top of a structure diagram. If the viewing cost of the node placed in the first position is v1, the viewing cost of the node place in the second position is v2, then v1<v2. The entire viewing cost of the navigation hierarchical structure diagram is defined as the viewing cost incurred for the user to browse through information associated with the navigation hierarchical structure diagram, starting from Level 1 nodes and proceeding down the tree (e.g., to Level 2 nodes, Level 3 nodes . . . etc), to reach the node associated with the desired information (e.g., category):

$$v\_cost_{ij} = v\_cost(query_i, tr_j) = \sum_{k=1}^{K} v_k * h(query_i, v\_cat_k) \quad (2)$$

wherein:

$query_i$ represents search request i; $tr_j$ represents the jth navigation hierarchical structure diagram;

$v\_cat_k$ represents the Level 1 kth node of the navigation hierarchical structure diagram;

$v_k$ represents the viewing cost of $v\_cat_k$;

$h(query_i, v\_cat_k)$ represents the confidence level for node $v\_cat_k$, $h(query_i, v\_cat_k)$ represents the sum of the confidence levels for all of the child and grandchild leaf nodes;

K is the total number of leaf nodes in the navigation hierarchical structure diagram.

It can be seen from formula (2) that navigation hierarchical structure diagram viewing costs can be determined based on the confidence levels for its leaf nodes and the branch positions where the leaf nodes are located in the navigation hierarchical structure diagram.

Now, FIGS. 5A, 5B, and 5C will be used as examples for further explanations. Assuming the choice of $v_k$=k, the respective confidence levels for leaf_cat1, leaf_cat2, leaf_cat3, leaf_cat4, and leaf_cat5 are h11, h12, h13, h14, h15.

For navigation hierarchical structure diagram tr1 shown in FIG. 5A, the Level 1 nodes are Indust1 and Indust2 and the respective viewing costs are 1 and 2, so the total viewing cost of tr1 is:

$$v\_cost_{11}=1\times(h_{11}+h_{12}+h_{13})+2\times(h_{14}+h_{15})$$

For navigation hierarchical structure diagram tr2 shown in FIG. 5B, the Level nodes are cat1 and Indust2 and the respective viewing costs are 1 and 2, so the total viewing cost of tr2 is:

$$v_{cost12}=1\times(h_{11}+h_{12}+h_{13})+2\times(h_{14}+h_{15})$$

It can be seen that the viewing costs of tr1 and tr2 are numerically the same, which is due to the fact that the two diagrams have similar Level 1 nodes, and in the two diagrams, the branch positions where the leaf nodes are located are the same.

For navigation hierarchical structure diagram tr3 shown in FIG. 5C, the Level 1 nodes are leaf_cat1, cat1 and Indust2 and the respective viewing costs are 1, 2 and 3, so the total viewing cost of tr3 is:

$$v\_cost_{13}=1\times h_{11}+2\times(h_{12}+h_{13})+3\times(h_{14}+h_{15})$$

b) Clicking cost (c_cost): c_cost is the cost associated with the number of nodes in the navigation hierarchical structure diagram that a user must click through for a particular query in order to find the leaf node that they desire. Generally speaking, c_cost is related to the depth (e.g., number of levels) of the navigation hierarchical structure diagram; the greater the depth of the navigation hierarchical structure diagram, the greater the clicking cost. As such, c_cost can be defined as a function of query query$_i$, navigation hierarchical structure diagram tr, navigation depth level and so forth.

$$c\_cost=g(query,tr,level);$$

In some embodiments, the clicking cost of the navigation hierarchical structure diagram can be defined as the arithmetic expectation of the number of clicks (e.g., through the search results returned for a query) for the user to find the information associated with the leaf node s/he desires:

$$c\_cost_{ij} = c\_cost(query_i, tr_j) = \sum_{k=1}^{K} level_k * h(query_i, leaf\_cat_k) \quad (3)$$

wherein:

query$_i$ represents search request i; tr$_j$ represents the jth navigation hierarchical structure diagram;

leaf_cat$_k$ represents the kth leaf node of the navigation hierarchical structure diagram;

level$_k$ represents the hierarchical position where leaf_cat$_k$ is located in the navigation hierarchical structure diagram;

h(query$_i$, v_cat$_k$) represents the confidence level for leaf_cat$_k$;

K is the total number of leaf nodes in the navigation hierarchical structure diagram.

It can be seen in formula (3) that the navigation hierarchical structure diagram clicking cost can be determined on the basis of the confidence levels for its leaf nodes and the hierarchical positions where the leaf nodes are located in the navigation hierarchical structure diagram.

Now, FIGS. 5A, 5B, and 5C will be used as examples for further explanations. Assume the choices of the respective confidence levels for leaf_cat1, leaf_cat2, leaf_cat3, leaf_cat4, and leaf_cat5 are h11, h12, h13, h14, h15.

For navigation hierarchical structure diagram tr$_i$ shown in FIG. 5A, its clicking cost is:

$$c\_cost11=3\times h11+3\times h12+3\times h13+2\times h14+2\times h15$$

For navigation hierarchical structure diagram tr$_2$ shown in FIG. 5B, its clicking cost is:

$$c\_cost12=2\times h11+2\times h12+2\times h13+2\times h14+2\times h15$$

For navigation hierarchical structure diagram tr$_3$ shown in FIG. 5C, its clicking cost is:

$$c\_cost13=1\times h11+2\times h12+2\times h13+2\times h14+2\times h15$$

c) Searching cost (s_cost):

The searching cost is a function of the viewing cost and the clicking cost:

$$s\_cost=f(query,tr,v\_cost,c\_cost)$$

In some embodiments, for a particular query, the searching cost in navigation hierarchical structure diagram tr$_j$ can be defined as:

$$s\_cost_{ij}=\lambda_1 *v\_cost_{ij}+\lambda_2 *c\_cost_{ij} \quad (4)$$

In formula (4), $\lambda_1$ and $\lambda_2$ are the respective weights for the viewing cost and the clicking cost. $\lambda_1$ and $\lambda_2$, respectively, represent the degree of importance of the viewing cost and the clicking cost and can be set in advance.

To summarize the above, in some embodiments, for a particular navigation hierarchical structure diagram, first, the viewing cost and clicking cost are calculated, then weights are attributed to the viewing cost and clicking cost in order to derive the searching cost of the navigation hierarchical structure diagram.

In various embodiments, subsequent to determining a searching cost corresponding to each navigation hierarchical structure diagram, the navigation hierarchical structure diagram with the lowest searching cost is identified and used as described below in further detail.

At 308, the navigation hierarchical structure diagram associated with the lowest searching cost is used to implement at least in part a website navigation process.

As described above, the searching cost is a function of the viewing cost and the clicking cost. So, a navigation hierarchical structure diagram with a relatively small searching cost correlates to either or both of a relatively small viewing cost and/or relatively small clicking cost. Thus, implementing website navigation using at least the navigation hierarchical structure diagram with the lowest searching cost may reduce user clicking operations during navigation to thereby lighten the burden on the website server and conserve network bandwidth resources. Furthermore, from the user's perspective, using the navigation hierarchical structure diagram with the lowest searching cost to implement the website navigation process may enable the user to find desirable results on a website in a faster and more convenient manner.

In some embodiments, the navigation hierarchical structure diagram that is used to implement at least in a website navigation process entails that in subsequent user queries, the returned results (e.g., categories of information) will be presented based on the hierarchy of categories as depicted in that navigation hierarchical structure diagram.

It should be noted that FIG. 4 is merely an example that is used to illustrate an initial website navigation category diagram. Also, FIGS. 5A, 5B, and 5C are merely examples used to illustrate possible navigation hierarchical structure diagrams that can be derived from the initial website navigation category diagram of FIG. 4. In some embodiments, when navigation hierarchical structure diagrams are being generated, further consideration can also be given to various binding conditions. The following are some examples of such binding conditions:

a) If there are leaf nodes with confidence levels greater than a threshold value, then those leaf nodes are placed in Level 1 in the navigation hierarchical structure diagrams.

The significance of this binding condition is: one or more users may have a greater desire for information associated with leaf nodes with large confidence levels (e.g., confidence levels that exceed the threshold value) so that they should appear earlier in the navigation process (e.g., Level 1). An example of this could be the node leaf_cat1 of FIG. 5C. In this example, assume that the derived confidence level for the node leaf_cat1 exceeded a threshold value and so in generating a navigation hierarchical structure diagram, it was determined to place leaf_cat1 in the diagram such that it would appear earlier in the navigation process. So, leaf_cat1 was placed in Level 1 Navigation of FIG. 5C.

b) If the total number of individual leaf nodes in a level at a navigation hierarchical structure diagram is greater than the number of categories that is allowed to be displayed at the web page, then one or more of leaf nodes from that level are moved to another level of the same navigation hierarchical structure diagram.

For example, if there are so many nodes in a level (e.g., Level 1) such that the total number of Level 1 nodes exceeds the display capabilities of the web page, this condition will lead to the user to have to perform, potentially, numerous operations (e.g., browsing through multiple webpages) that could lead to an increase in searching costs. Therefore, some nodes from Level 1 can be moved to a different level (e.g., Level 2) of the same navigation hierarchical structure diagram such that the remaining number of nodes at Level 1 fits within the display capabilities of the webpage.

c) If within the same level of a navigation hierarchical structure diagram, certain nodes appear more than they appeared in the initial static hierarchical relationship, then the repeated nodes can be eliminated.

This binding condition can prevent repetitive nodes from appearing repeatedly in navigation hierarchical structure diagrams.

One or more of the binding conditions described above can be considered when generating navigation hierarchical structure diagrams. Furthermore, each binding condition can be considered independent of the other(s) or more than one binding condition can be considered in combination. One advantage to considering the binding conditions during generation of navigation hierarchical structure diagrams is that fewer different navigation hierarchical structure diagrams may be generated, which would increase the efficiency in selecting one navigation hierarchical structure diagram (e.g., as in 306) among the generated diagrams.

Figure 6:
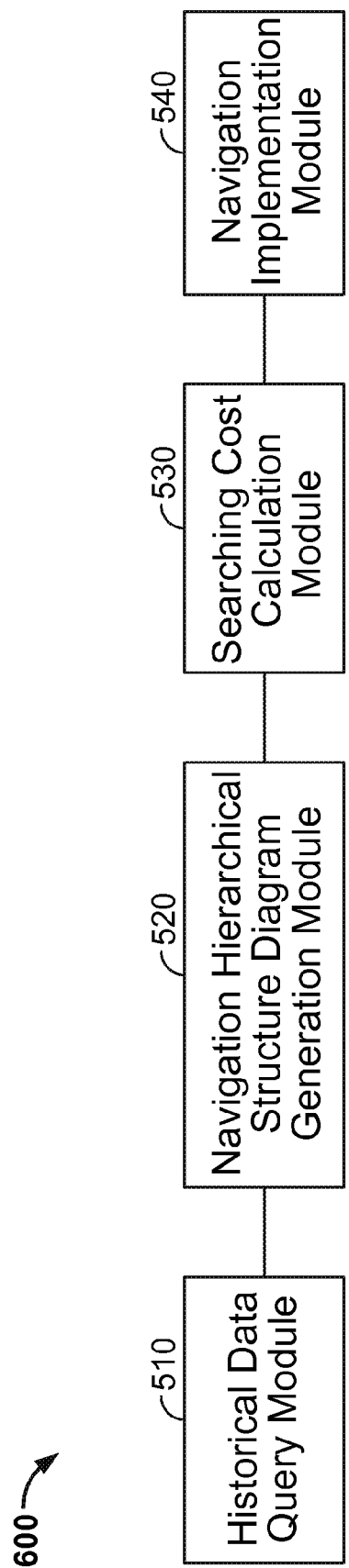
FIG. 6 is a diagram showing an embodiment of a system for website navigation.

FIG. 6 is a diagram showing an embodiment of a system for website navigation. In some embodiments, process 300 can be implemented at least in part using system 600. In some embodiments, system 200 can be implemented at least in part using one or more modules of system 600. In some embodiments, historical data query module 510, navigation hierarchical structure diagram generation module 520, searching cost calculation module 530, and navigation implementation module 540 are implemented in association with an electronic commerce website. For example, system 600 could in communication with or is a component of a web server supporting the electronic commerce website.

The modules and submodules can be implemented as software components executing on one or more processors, as hardware such as programmable logic devices and/or application Specific Integrated Circuits designed to perform certain functions or a combination thereof. In some embodiments, the modules can be embodied by a form of software products which can be stored in a nonvolatile storage medium (such as optical disk, flash storage device, mobile hard disk, etc.), including a number of instructions for making a computer device (such as personal computers, servers, network equipments, etc.) implement the methods described in the embodiments of the present invention. The modules and submodules may be implemented on a single device or distributed across multiple devices. The modules and submodules can be connected to each other logically, via a network, and/or physically.

Historical data query module 510 is configured to query for historical data on user operating behavior (e.g., from a database storing historical user operating behavior data). In some embodiments, the historical data on user operation behavior could include one or more of the following: queries (or keywords thereof) previously submitted by the user, desired categories (e.g., a category associated with the node at which the user finished browsing through the navigation hierarchical structure diagram), categories selected (e.g., clicked on) before the user reached the desired categories, a count associated with the number of queries the user has submitted, and counts associated with each different query the user has submitted. Historical data query module 510 is also configured to derive the confidence level for each individual leaf node in a website navigation category diagram using at least the queried for historical data on user operation behavior. In some embodiments, a website navigation category diagram is predefined/predetermined by an operator of system 600 or a third party. In some embodiments, a website navigation category diagram corresponds to the initial static hierarchical relationship of categories maintained by an associated website.

Navigation hierarchical structure diagram generation module 520 is configured to generate one or more navigation hierarchical structure diagrams based on said website navigation category diagram. In various embodiments, each navigation hierarchical structure diagram has leaf nodes substantially similar to those of the website navigation category diagram. In some embodiments, navigation hierarchical structure diagrams are generated based on possible variations of arrangements of nodes of the website navigation category diagram.

In some embodiments, in each navigation hierarchical structure diagram generated by navigation hierarchical structure diagram generation module 520, the leaf nodes are arranged in an order/sequence based on their corresponding confidence levels. For example, the leaf nodes in the order of their descending corresponding confidence levels. In some embodiments, this ordering of the leaf nodes corresponds to the order (e.g., left to right on a webpage or top to bottom on the webpage) that the leaf nodes are displayed at a webpage.

In some embodiments, navigation hierarchical structure diagram generation module 520 can generate navigation hierarchical structure diagrams based on one or more of the following binding conditions:

(1) leaf nodes with confidence levels greater than a preset threshold value are placed in Level 1 of the navigation hierarchical structure diagram, (2) the number of nodes in a level of the navigation hierarchical structure diagram is no greater than the number that the web page allows to be displayed, (3) a particular leaf nodes that appears in the navigation hierarchical structure diagram more than a substantially similar leaf node at the website navigation category diagram is eliminated.

Searching cost calculation module 530 is configured to calculate the searching cost of each navigation hierarchical structure diagram. In various embodiments, the confidence levels of the nodes as derived by historical data query module 510 is used to calculate the searching cost of the navigation hierarchical structure diagrams.

Navigation implementation module 540 is configured to implement the website navigation of the associated website using the navigation hierarchical structure diagram with the lowest searching cost.

Figure 7:
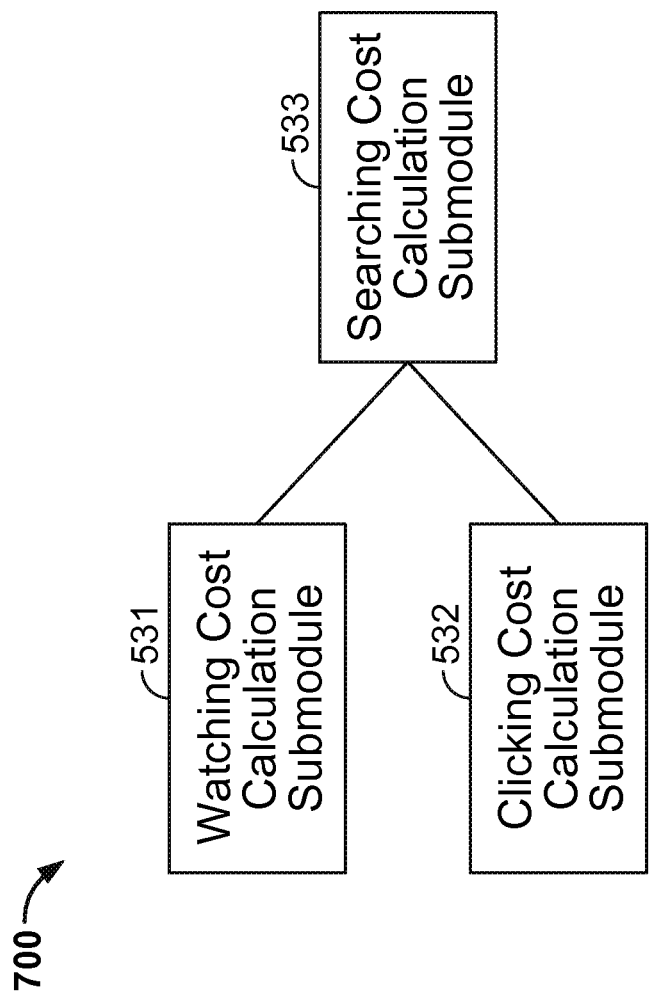
FIG. 7 is a diagram showing an embodiment of a searching cost calculation module.

FIG. 7 is a diagram showing an embodiment of a searching cost calculation module. In some embodiments, the example shown in FIG. 7 can be used to implement searching cost calculation module 530 of FIG. 6.

Viewing cost calculation submodule 531 is configured to calculate the viewing cost of a navigation hierarchical structure diagram. In some embodiments, the viewing cost of a navigation hierarchical structure diagram is calculated based on the confidence levels for the leaf nodes and the branch positions where the leaf nodes are located in that navigation hierarchical structure diagram.

Clicking cost calculation submodule 532 is configured to calculate the clicking cost of a navigation hierarchical structure diagram. In some embodiments, the clicking cost of a navigation hierarchical structure diagram is calculated based on the confidence levels for the leaf nodes and the hierarchical positions where the leaf nodes are located in the navigation hierarchical structure diagram. In some embodiments, clicking cost calculation submodule 532 can derive the clicking cost for the navigation hierarchical structure diagram by summing the products of the confidence levels and the positions of all of the leaf nodes where they are located in the navigation hierarchical structure diagram.

Searching cost calculation submodule 533 is configured to derive the searching cost of the navigation hierarchical structure diagram. In some embodiments, the searching cost of a navigation hierarchical structure diagram is determined at least in part by attributing weights to the viewing cost and the clicking cost and combining the weighted viewing and clicking costs. In some embodiments, the weights assigned to the viewing cost and the clicking cost are predetermined.

Although in the above description, each type of module included its own function and was described separately, at least some of the functions of more than one module can be implemented in the same or multiple software and/or hardware.

It can be known from the above description of the modes of implementation that technical personnel in this field can clearly understand that the present application could be implemented by relying on software plus the necessary general-purpose hardware platform modes. Based on this understanding, the technical program of the present application can in essence be embodied in the form of software products or in part with contributions made by existing technology, and the computer software product can be stored in storage media such as ROM/RAM, magnetic disks, optical disks, etc. that contain certain instructions used to cause a piece of computer equipment (which can be a personal computer, server, or network equipment, etc.) to execute said methods of each of the embodiments or certain portions of the embodiments of the present application.

Each of the embodiments in the present description employ progressive description modes and it would be acceptable to refer among the identical or similar portions of each of the embodiments. Some of the focused explanations of each of the embodiments represent the places of differences from the other embodiments. In particular, for the system embodiments, because they are basically similar to the method embodiments, the descriptions are rather simple, and it is acceptable to refer to the associated method embodiment portion descriptions. The system embodiments described above are merely rough descriptions, and the modules described above in them that serve as separate components can be or also cannot be physically separated, the components that serve for module displays can be or also cannot be physical modules, i.e., they can be located in one place or can also be distributed onto several network modules. The portions among them that are actually necessary can be selected or all of the modules used to implement the object of the present embodiment programs. Under conditions of not expending creative labor, common technical personnel in this field can also understand and implement them.

The present application can be used in a multitude of general-purpose or special-purpose computer system environments or configurations. For example: personal computers, server computers, handheld equipment or portable equipment, flat panel equipment, multiprocessor systems, systems based on microprocessors, set-top boxes, programmable consumer electronic equipment, network PC, microcomputers, large computers, distributed computing environments comprising any of the above systems or equipment and so forth.

The present application can be described by the general text above and below by computers that execute commands that computers are able to execute, for example, programming modules. Generally, programming modules comprise routines, programs, objects, packages, data structures, etc. that execute specific tasks or implement specific abstract data types. The present application can also be achieved in distributed-type computing environments, and in these distributed-type computing environments, remote processing equipment connected via communications networks is used to execute tasks. In distributed-type computing environments, program modules can be located in local and remote computer storage media contained in storage equipment.

The above description is merely the specific modes of implementation of the present application, and it should be pointed out that for common technical personnel in this field, under a prerequisite of not departing from the principles of the present application, certain improvements and embellishments could be made, and these improvements and embellishments should be viewed as within the scope of protection of the present application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A website navigation implementing method, comprising:
    deriving a confidence level for at least one leaf node of a website navigation category diagram using historical user operation data, wherein the confidence level for the at least one lead node is determined based at least in part on historical search behavior data;
    generating a plurality of navigation hierarchical structure diagrams based on the website navigation category diagram, wherein for at least one of the plurality of navigation hierarchical structure diagrams, leaf nodes with a corresponding confidence level greater than a preset threshold value are included in a predetermined level of the navigation hierarchical structure diagram;

determining a searching cost associated with each of the plurality of navigation hierarchical structure diagrams;

determining the navigation hierarchical structure diagram associated with the lowest searching cost; and implementing, using a processor, at least in part a website navigation process using the navigation hierarchical structure diagram associated with the lowest searching cost.

2. The method of claim 1, wherein leaf nodes of a navigation hierarchical structure diagram are substantially similar to at least a subset of nodes of the website navigation category diagram.

3. The method of claim 1, wherein determining the searching cost associated with the navigation hierarchical structure diagram includes:

calculating a viewing cost of the navigation hierarchical structure diagram based at least in part on confidence levels of leaf nodes associated with the navigation hierarchical structure diagram and branch positions corresponding to the leaf nodes;

calculating a clicking cost of the navigation hierarchical structure diagram based at least in part on confidence levels of the leaf nodes and hierarchical positions corresponding to the leaf nodes; and calculating the searching cost associated with the navigation hierarchical structure diagram based at least in part on the clicking cost and the viewing cost.

4. The method of claim 1, further comprising displaying leaf nodes associated with a navigation hierarchical structure diagram in an order based on corresponding confidence levels of the leaf nodes.

5. The method of claim 1, wherein the plurality of navigation hierarchical structure diagrams is generated using one or more of the following binding conditions:

a total number of leaf nodes in a level of the navigation hierarchical structure diagram is no greater than a number of leaf nodes for which associated information is permitted to be displayed at a web page; for a particular leaf node that appears more frequently in the navigation hierarchical structure diagram more than a substantially similar leaf node appears at the website navigation category diagram, at least one copy of that particular leaf node is eliminated.

6. The method of claim 3, wherein calculating the viewing cost of the navigation hierarchical structure diagram based on at least in part on confidence levels of leaf nodes associated with the navigation hierarchical structure diagram and branch positions corresponding to the leaf nodes, includes:

setting a predetermined corresponding viewing cost for a node located in Level 1 of the navigation hierarchical structure diagram, wherein a viewing cost of a node located at a next position in the navigation hierarchical structure diagram corresponds to a higher viewing cost than the corresponding viewing cost for the node located in Level 1; and adding products of corresponding viewing costs and confidence levels for each node located in Level 1 of the navigation hierarchical structure diagram, wherein the corresponding confidence level of a node located in Level 1 of the navigation hierarchical structure includes a sum of all confidence levels corresponding to child nodes to that node.

7. The method of claim 3, wherein calculating the viewing cost $v\_cost_{ij}$ of the navigation hierarchical structure diagram includes using:

$$v\_cost_{ij} = v\_cost(query_i, tr_j) = \sum_{k=1}^{K} v_k * h(query_i, v\_cat_k)$$

wherein:

$query_i$, represents search request i; $tr_j$ represents the jth navigation hierarchical structure diagram;

$v\_cat_k$ represents the Level 1 kth position node of the jth navigation hierarchical structure diagram;

$v_k$ represents the viewing cost of $v\_cat_k$;

$h(query_i, v\_cat_k)$ represents the confidence level for node $v\_cat_k$, $h(query_i, v\_cat_k)$ represents the sum of the confidence levels for all of the child and grandchild leaf nodes; and K is the total number of leaf nodes in the jth navigation hierarchical structure diagram.

8. The method of claim 3, wherein calculating the clicking cost of the navigation hierarchical structure diagram based at least in part on confidence levels of the leaf nodes and hierarchical positions corresponding to the leaf nodes includes:

adding products of corresponding confidence levels and hierarchical positions in the navigation hierarchical structure diagram for all leaf nodes of the navigation hierarchical structure diagram.

9. The method of claim 8, wherein calculating the clicking cost $c\_cost_{ij}$ of the navigation hierarchical structure diagram includes using:

$$c\_cost_{ij} = c\_cost(query_i, tr_j) = \sum_{k=1}^{K} level_k * h(query_i, leaf\_cat_k)$$

wherein:

$query_i$, represents search request i; $tr_j$ represents the jth navigation hierarchical structure diagram;

$leaf\_cat_k$ represents the kth leaf node of the jth navigation hierarchical structure diagram;

$level_k$ represents the hierarchical position where $leaf\_cat_k$ is located in jth navigation hierarchical structure diagram;

$h(query_i, v\_cat_k)$ represents the confidence level for $leaf\_cat_k$; and

K is the total number of leaf nodes in the jth navigation hierarchical structure diagram.

10. A system for implementing website navigation, comprising:

a processor configured to:

derive a confidence level for at least one leaf node of a website navigation category diagram using historical user operation data, wherein the confidence level for the at least one lead node is determined based at least in part on historical search behavior data;

generate a plurality of navigation hierarchical structure diagrams based on the website navigation category diagram, wherein for at least one of the plurality of navigation hierarchical structure diagrams, leaf nodes with a corresponding confidence level greater than a preset threshold value are included in a predetermined level of the navigation hierarchical structure diagram;

determine a searching cost associated with each of the plurality of navigation hierarchical structure diagrams;

determine the navigation hierarchical structure diagram associated with the lowest to searching cost; and implement at least in part a website navigation process using the navigation hierarchical structure diagram associated with the lowest searching cost; and a memory coupled to the processor and configured to provide the processor with instructions.

11. The system of claim 10, wherein leaf nodes of the navigation hierarchical structure diagram are substantially similar to at least a subset of nodes of the website navigation category diagram.

12. The system of claim 10, wherein the processor is configured to determine the searching cost associated with the navigation hierarchical structure diagram includes the processor is configured to:

calculate a viewing cost of the navigation hierarchical structure diagram based at least in part on confidence levels of leaf nodes associated with the navigation hierarchical structure diagram and branch positions corresponding to the leaf nodes;

calculate a clicking cost of the navigation hierarchical structure diagram based at least in part on confidence levels of the leaf nodes and hierarchical positions corresponding to the leaf nodes; and calculate the searching cost associated with the navigation hierarchical structure diagram based at least in part on the clicking cost and the viewing cost.

13. The system of claim 10, wherein the processor is further configured to display leaf nodes associated with a navigation hierarchical structure diagram in an order based on corresponding confidence levels of the leaf nodes.

14. The method of claim 10, wherein the plurality of navigation hierarchical structure diagrams is generated using one or more of the following binding conditions:

a total number of leaf nodes in a level of the navigation hierarchical structure diagram is no greater than a number of leaf nodes for which associated information is permitted to be displayed at a web page; for a particular leaf node that appears more frequently in the navigation hierarchical structure diagram more than a substantially similar leaf node appears at the website navigation category diagram, at least one copy of that particular leaf node is eliminated.

15. The system of claim 12, wherein the processor is configured to calculate the viewing cost of the navigation hierarchical structure diagram based on at least in part on confidence levels of leaf nodes associated with the navigation hierarchical structure diagram and branch positions corresponding to the leaf nodes, includes the processor being configured to:

set a predetermined corresponding viewing cost for a node located in Level 1 of the navigation hierarchical structure diagram, wherein a viewing cost of a node located at a next position in the navigation hierarchical structure diagram corresponds to a higher viewing cost than the corresponding viewing cost for the node located in Level 1; and add products of corresponding viewing costs and confidence levels for each node located in Level 1 of the navigation hierarchical structure diagram, wherein the corresponding confidence level of a node located in Level 1 of the navigation hierarchical structure includes a sum of all confidence levels corresponding to child nodes to that node.

16. The system of claim 12, wherein the processor is configured to calculate the clicking cost of the navigation hierarchical structure diagram based at least in part on confidence levels of the leaf nodes and hierarchical positions corresponding to the leaf nodes includes the processor is configured to:

add products of corresponding confidence levels and hierarchical positions in the navigation hierarchical structure diagram for all leaf nodes of the navigation hierarchical structure diagram.

17. A computer program product for implementing website navigation, the computer program product being embodied in a non-transitory computer readable storage medium and comprising computer instructions for:

deriving a confidence level for at least one leaf node of a website navigation category diagram using historical user operation data, wherein the confidence level for the at least one lead node is determined based at least in part on historical search behavior data;

generating a plurality of navigation hierarchical structure diagrams based on the website navigation category diagram, wherein for at least one of the plurality of navigation hierarchical structure diagrams, leaf nodes with a corresponding confidence level greater than a preset threshold value are included in a predetermined level of the navigation hierarchical structure diagram;

determining a searching cost associated with each of the plurality of navigation hierarchical structure diagrams;

determining the navigation hierarchical structure diagram associated with the lowest to searching cost; and implementing at least in part a website navigation process using the navigation hierarchical structure diagram associated with the lowest searching cost.

\* \* \* \* \*

UNITED STATES PATENT AND TRADEMARK OFFICE
CERTIFICATE OF CORRECTION

PATENT NO.         : 8,719,733 B2                                         Page 1 of 1
APPLICATION NO.    : 13/134324
DATED              : May 6, 2014
INVENTOR(S)        : Liao et al.

It is certified that error appears in the above-identified patent and that said Letters Patent is hereby corrected as shown below:

In the claims
In column 14, line 61, claim 1, delete "lead" insert --leaf--, therefor.
In column 16, line 54, claim 10, delete "lead" insert --leaf--, therefor.
In column 18, line 31, claim 17, delete "lead" insert --leaf--, therefor.

Signed and Sealed this
Fourteenth Day of June, 2016

Michelle K. Lee
*Director of the United States Patent and Trademark Office*